United States Patent
Pula et al.

(10) Patent No.: US 11,176,120 B2
(45) Date of Patent: Nov. 16, 2021

(54) FOREIGN KEY CONSTRAINT ENFORCEMENT ACROSS DATABASE INSTANCES

(71) Applicant: salesforce.com, inc., San Francisco, CA (US)

(72) Inventors: Vijaya S. Pula, Georgetown, TX (US); Kathiravan Sengodan, Alpharetta, GA (US); Robert G. Dillon, Jr., Kirkland, WA (US)

(73) Assignee: salesforce.com, inc., San Francisco, CA (US)

( * ) Notice: Subject to any disclaimer, the term of this patent is extended or adjusted under 35 U.S.C. 154(b) by 172 days.

(21) Appl. No.: 16/713,370

(22) Filed: Dec. 13, 2019

(65) Prior Publication Data

US 2021/0182271 A1    Jun. 17, 2021

(51) Int. Cl.
  *G06F 16/23* (2019.01)
  *G06F 16/22* (2019.01)
(52) U.S. Cl.
  CPC ...... *G06F 16/2365* (2019.01); *G06F 16/2282* (2019.01)
(58) Field of Classification Search
  CPC ............ G06F 16/2365; G06F 16/2282
  See application file for complete search history.

(56) References Cited

U.S. PATENT DOCUMENTS

| 4,947,320 | A | 8/1990 | Crus et al. |
| 8,010,521 | B2 | 8/2011 | Kissner et al. |
| 8,065,323 | B2 | 11/2011 | Sallakonda et al. |
| 2002/0194149 | A1* | 12/2002 | Gerber ............. G06F 16/284 |
| 2016/0179869 | A1* | 6/2016 | Hutchins ........... G06F 16/2365 |
| | | | 707/703 |
| 2018/0246934 | A1* | 8/2018 | Arye ................ G06F 16/2272 |

OTHER PUBLICATIONS

Farina, SQL Server Referential Integrity Across Databases Using Triggers, pp. 1-11, Mar. 4 (Year: 2019).*

* cited by examiner

*Primary Examiner* — Albert M Phillips, III
(74) *Attorney, Agent, or Firm* — Kowert, Hood, Munyon, Rankin & Goetzel, P.C.

(57) ABSTRACT

Disclosed techniques relate to enforcing table dependencies for a database schema when tables are maintained by separate database instances. In some embodiments, a database system generates configuration data based on foreign key constraints for multiple database tables. In some embodiments, in response to a request from an application server to access data, the database system accesses the configuration data (where the configuration data specifies a relationship between a field of a child table and a field of a parent table and at least a portion of the parent table is stored in a different database instance than the child table) and determines whether the request satisfies the specified relationship. In some embodiments, enforcing dependencies at an intermediate orchestration layer maintained by the database systems allows applications to submit requests without considering table dependencies.

20 Claims, 9 Drawing Sheets

Employees table
210

| emp_id | first_name | last_name | job_id | start_date | email_address | dep_id |
|---|---|---|---|---|---|---|
| 10000 | Tom | Brady | 100 | 1/2/2019 | tb@c.com | 11111 |
| 10001 | Steve | Barnes | 200 | 9/3/2015 | s@c.com | 11111 |
| 10002 | Ron | Felt | 300 | 5/5/2017 | rf@c.com | 22222 |
| 10003 | Dan | Xiao | 400 | 5/5/2010 | dan@c.com | 22222 |

Departments table
220

| dep_id | department_name | location |
|---|---|---|
| 11111 | Engineering | New York |
| 22222 | Sales | San Francisco |

Configuration data
510

| Table Name | Foreign Key | Relationship | Datastore | Connection |
|---|---|---|---|---|
| Employees | department_id | Child | Primary Database | DB connection1 |
| Departments | employee_id | Parent | Micro service 140A | DB connection2 |

FOREIGN KEY CONSTRAINT ENFORCEMENT ACROSS DATABASE INSTANCES

BACKGROUND

Technical Field

Embodiments described herein relate to database technology and, in particular, to handling dependencies between tables in the context of a database schema distributed across multiple database instances.

Description of the Related Art

Database tables are often highly interdependent, with foreign key constraints being an example technique for enforcing dependencies between tables at the database layer. A foreign key is a field in one table that refers to the primary key in another table. A foreign key constraint is used to prevent actions that would destroy links between tables (e.g., new data being inserted into the child table should be one of the values contained in a field the parent table, and deleting data from a parent table should not leave corresponding records in the child table). In multi-tenant contexts, tables for a tenant may have a large number of dependencies. Further, as the amount of data for a given tenant or set of tenants grows, a monolithic database system may not scale well.

Figure 1:
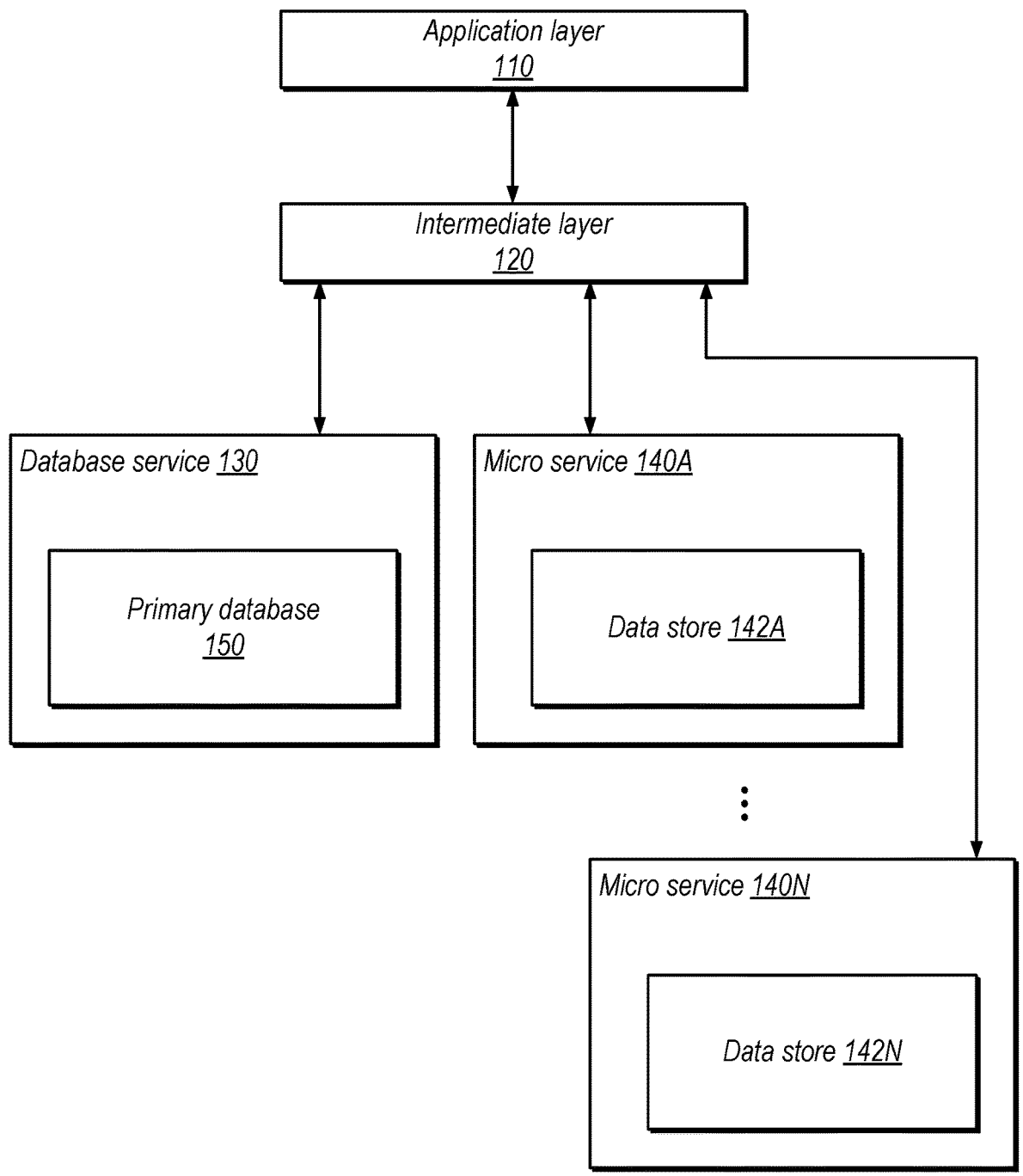
FIG. 1 is a block diagram illustrating an example intermediate layer configured to enforce database table dependencies for requests from an application layer, according to some embodiments.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. For example, a "database module configured to access a data store" is intended to cover, for example, equipment that has a program code or circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

DETAILED DESCRIPTION

In various disclosed embodiments, a database schema for an entity is split across multiple database instances, which breaks foreign key constraints for tables moved to different database instances. In these embodiments, the system generates configuration data to reflect the broken constraints and an intermediate orchestration layer enforces the constraints for incoming application requests. This may advantageously provide scalability and maintain data integrity without requiring applications to internally manage foreign key constraints.

Database tables are often highly interdependent, with foreign key constraints being an example technique for enforcing dependencies between tables at the database layer. A foreign key is a field in one table that refers to the primary key in another table. A foreign key constraint is used to prevent actions that would destroy links between tables (e.g., new data being inserted into the child table should have one of the values contained in a field the parent table, and deleting data from a parent table should not leave corresponding values in the child table).

In some embodiments, the system initially stores data for an entity (e.g., a tenant in a multi-tenant database system) in a single monolithic database instance. For various reasons, the database system may determine to split the data across multiple database instances. These separate instances may be managed by micro services, for example. As used herein, the term "database instance" refers to a set of processes and resources (e.g., memory structures and storage) that manage database information stored in an underlying data store. Each database instance is independent of other database instances. For example, accessing a first database instance will not return data from a second database instance. Thus, if a database schema is split across database instances, foreign key constraints are broken such that a given database instance cannot enforce constraints that rely on data that is now stored in another instance.

In disclosed embodiments, configuration data is generated to reflect foreign key constrains when splitting the schema. An intermediate micro service orchestration layer includes wrapper functions configured to enforce foreign key relationships based on the configuration data. This may allow applications to operate without worrying about foreign key constraints, e.g., by calling the wrapper functions serviced by the intermediate layer.

FIG. 1 is a block diagram showing an example topology with multiple database instances used to store data for an entity, according to some embodiments. In the illustrated example, an intermediate layer 120 communicates with an application layer 110 (e.g., as implemented by application server(s)) and underlying database service 130 and micro services 140A-140N. In some embodiments, each of the database service 130 and micro services 140 implements a separate database instance. In some embodiments, intermediate layer 120, database service 130, and micro services 140 are implemented by one or more database servers while application layer 110 is implemented by one or more application servers.

Database service 130, in the illustrated example, maintains a primary database 150. Note that in some embodiments, all data for the entity may be split across micro services while in other embodiments a primary database may be maintained for the entity with remaining data split across one or more micro services. Thus, the illustrated example topology with a primary database is included for purposes of illustration but is not intended to limit the scope of the present disclosure.

Micro services 140, in the illustrated embodiment, each manage a data store 142. These data stores may be configured to store different tables for the entity, for example. Various data stores discussed herein may implement various database topologies. For example, data stores may be relational or non-relational or may include both relational and non-relational portions.

Intermediate layer 120, in the illustrated embodiment, receives requests from application layer 110 and responds with requested data. In some embodiments, intermediate layer 120 may route the requests to the appropriate underlying service. In other embodiments, the requests may explicitly specify the target service. In various embodiments, the intermediate layer is configured to check the requests based on configuration data to determine whether foreign key constraints (e.g., that existed prior to splitting the schema) are satisfied.

Figure 2:
FIG. 2 is a diagram illustrating two example tables with a foreign key constraint, according to some embodiments.
Figure 2:

FIG. 2 is a diagram illustrating entries in two examples tables for an entity, according to some embodiments.

Employees table 210, in the illustrated embodiment, stores data for four employees: Tom, Steve, Ron, and Dan. Each entry in table 210 includes the following fields: employee_id (emp_id), first_name, last_name, job_id, start_date, email_address, and department_id (dep_id).

Departments table 220, in the illustrated embodiment, stores data for two departments: engineering and sales. Each entry in table 220 includes the following fields: department_id (dep_id), department name, and location.

In various embodiments, there may be complex interrelationships between tables, e.g., where a child table has dependencies on multiple parent tables or a parent table has multiple different child tables. The disclosed examples are included for purposes of illustration, but are simplified relative to typical real-world implementations.

In the illustrated embodiment, the employees table 210 has a child relationship with the departments table 220, where the dep_id field of entries in table 210 should be present in at least one entry of departments table 220. In the illustrated example, this relationship is satisfied because both of the dep_id values in the child table 210 ("11111" and "22222") are present in the parent table 220. In this example, the dep_id in the departments table 220 is a primary key and the dep_id in the employees table 210 is a foreign key. The foreign key constraint prevents actions that would destroy the link between the tables (e.g., deleting a department without deleting the entries in the employees table that list the department) and prevent insertion of invalid data.

The following MySQL pseudo-code shows how one might create the employees table with a foreign key constraint. Traditionally, information specifying the constraint would be stored and enforced by the database instance based on this code.

```
CREATE TABLE employees (
    emp_id int NOT NULL,
    ...
    dep_id varchar(45),
    PRIMARY KEY (emp_id)
    FOREIGN KEY (dep_id) REFERENCES departments(dep_id)
);
``` where the last line creates a foreign key constraint with the parent departments table.

Figure 3:
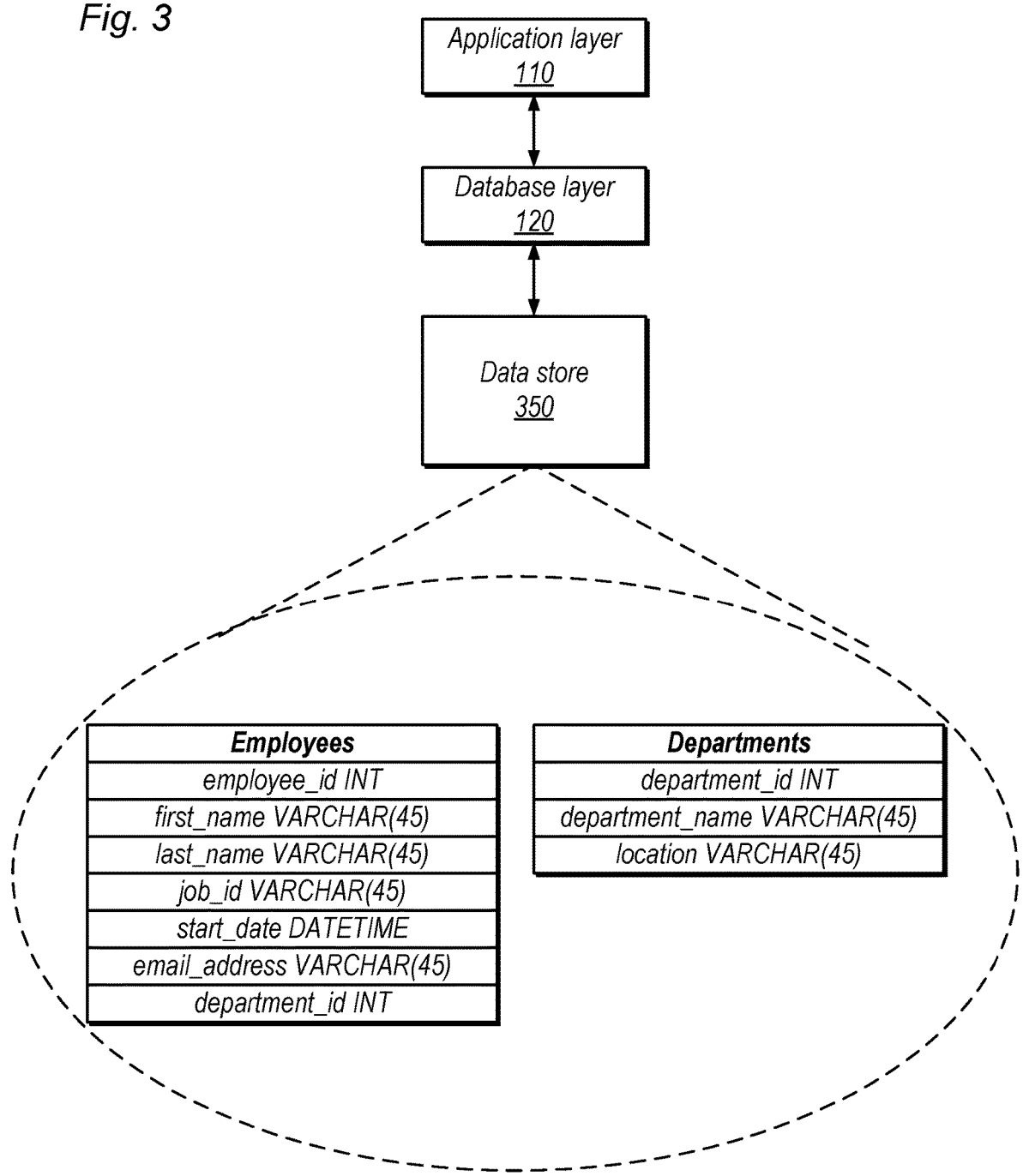
FIG. 3 is a diagram illustrating example storage of the tables of FIG. 2 in a single database instance, according to some embodiments.

FIG. 3 is a diagram illustrating an example situation in which the schema for the entity spans a single database instance, according to some embodiments. In this example, the database instance corresponding to data store 350 stores both the employees and departments tables. As discussed above, this database instance may also maintain the foreign key constraint for the dep_id field.

Figure 4:
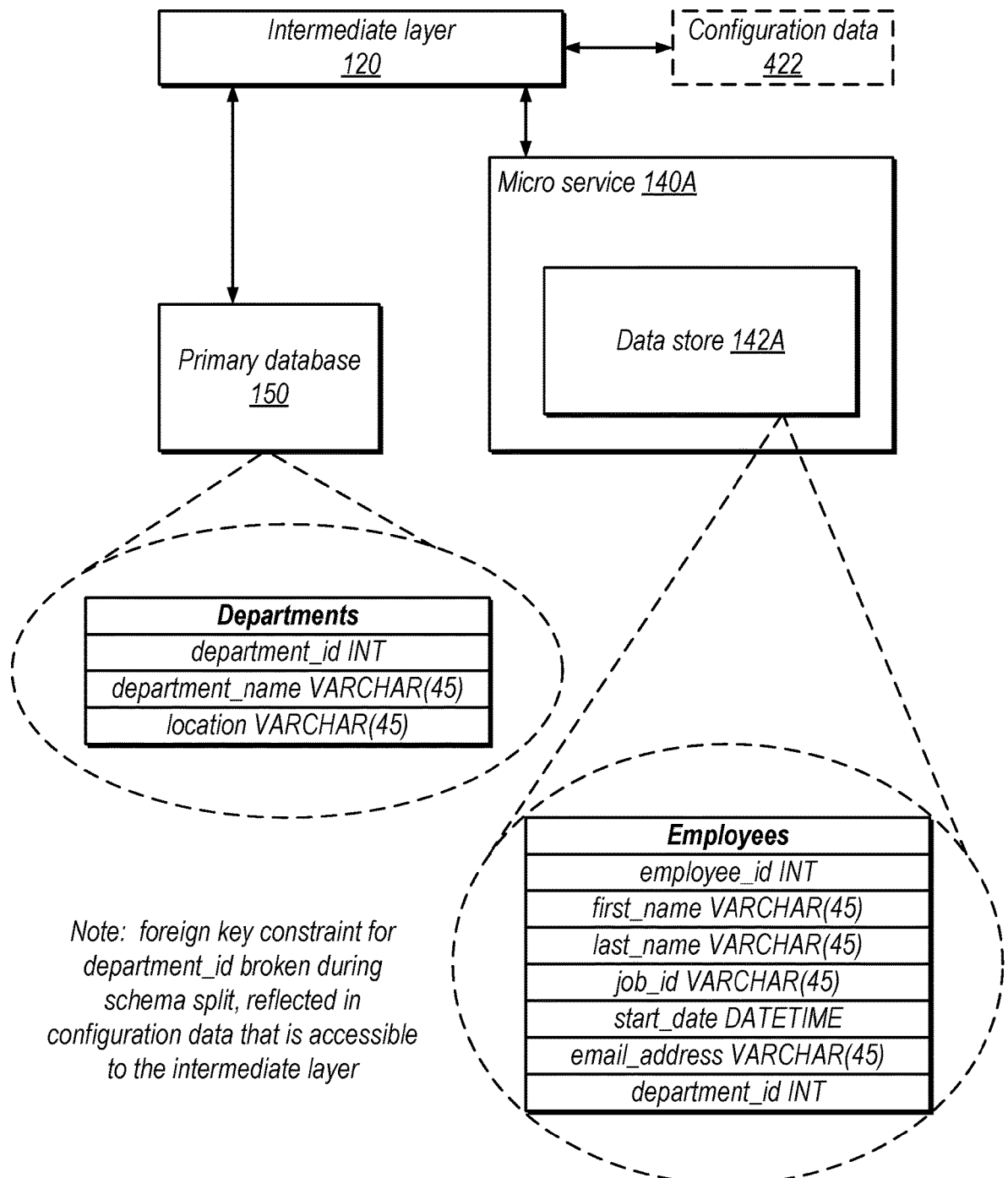
FIG. 4 is a diagram illustrating example storage of the tables of FIG. 2 using different database instances, according to some embodiments.

FIG. 4 is a diagram illustrating an example situation in which the schema for the entity is split across multiple database instances and configuration data is generated, according to some embodiments. As shown, the employees table is stored in data store 142A and the departments table is stored in primary database 150. During the schema split the foreign key constraint for the dep_id field is broken because the tables are not stored in different database instances. In the illustrated example, the system generates configuration data 422 based on the split to reflect any broken dependencies. Note that the system may generate configuration data in response to splitting an existing schema or based on generating a new schema that is initially split across database instances.

Figure 5:
FIG. 5 is a diagram illustrating example configuration data generated based on splitting of a schema across multiple database instances, according to some embodiments.

FIG. 5 is a diagram illustrating example configuration data for the situation of FIG. 4, according to some embodiments. In the illustrated example, the configuration data includes the following fields: table name, foreign key, relationship, datastore, and datastore connection. The intermediate layer 120 may read configuration data during service startup and use the specified mappings to handle requests during subsequent database operations. In the illustrated example, the foreign key field indicates a foreign key field in another table, the relationship field indicates whether the table has a child or parent with the other table, and the datastore field indicates the database instance in which the other table is maintained.

Consider the following scenarios in which a request may fail based on the example data reflected in FIG. 2 and the configuration data of FIG. 5. An application attempts to insert a record into the employees table 210 with employee ID 10004, department ID 33333, first name "John," last name "Scott", and location "Atlanta." The intermediate layer 120 checks the configuration data 510 and detects that the record's department ID depends on the departments table in the primary database datastore. The intermediate layer 120 accesses the departments table and detects that no records match the department ID 33333 and rejects the insert operation. If an application attempts to read all employee records from the employees table in the micro service datastore, the intermediate layer 120 fetches employee records with employee IDs 1000, 10001, 10002, and 10003. Before returning the results, the intermediate layer 120 checks that these records have department IDs that are valid in entries in the departments table 220. In this particular example, all the records in the employees table 210 have corresponding parent keys in the departments table 220 and can all be returned in response to the request. If one or more records did not meet the check, intermediate layer 120 may return only records whose department IDs have corresponding entries in the departments table 220. For example, if the entry in departments table with department ID 22222 did not exist, only records with employee IDs 10000 and 10001 may be returned in response to the request.

Figure 6A:
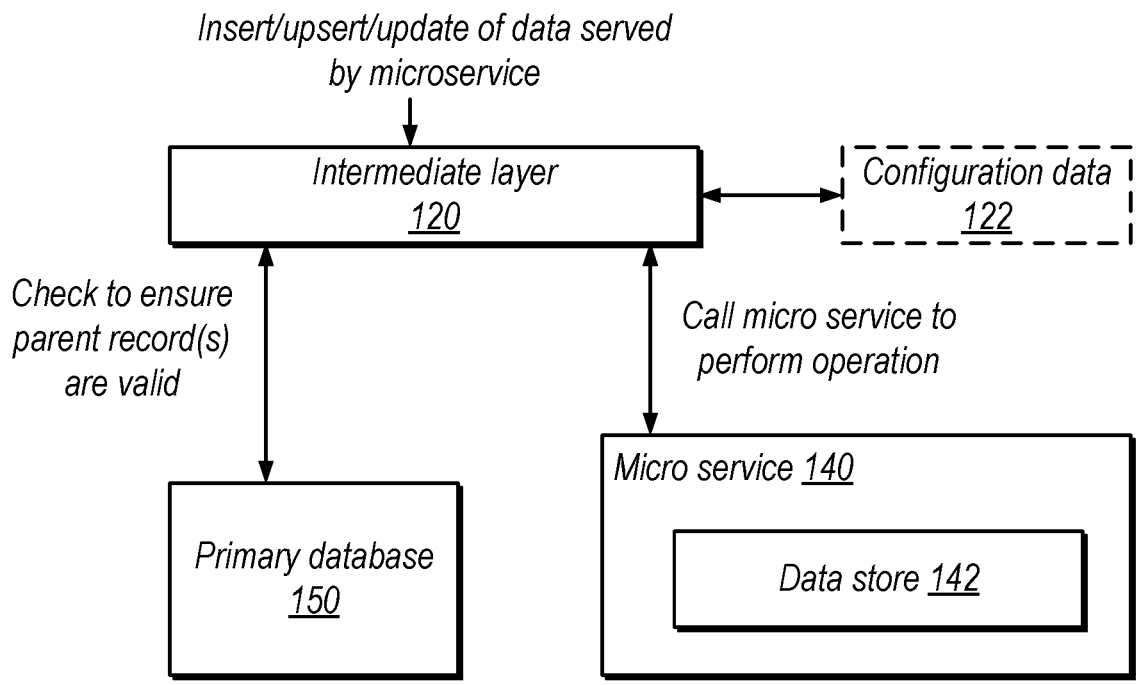
FIG. 6A is a diagram illustrating example handling of an insert, upsert, or update operation for a child table, according to some embodiments.

FIG. 6A is a block diagram illustrating an example technique for handling an insert/upsert/update of data serviced by a micro service, according to some embodiments. In the illustrated example, intermediate layer 120 receives an insert, upsert, or update of data served by micro service 140. In response, intermediate layer 120 accesses the configuration data 122 and then checks to ensure that parent record(s) for the child records being inserted in primary database 150 are present and valid. If so, intermediate layer 120 calls micro service 140 to perform the requested operation using data store 142. If not, intermediate layer 120 may send a failure notification to the requesting application. Note that the database system may not impose restrictions on similar requests to insert, upsert, or update parent records.

Figure 6B:
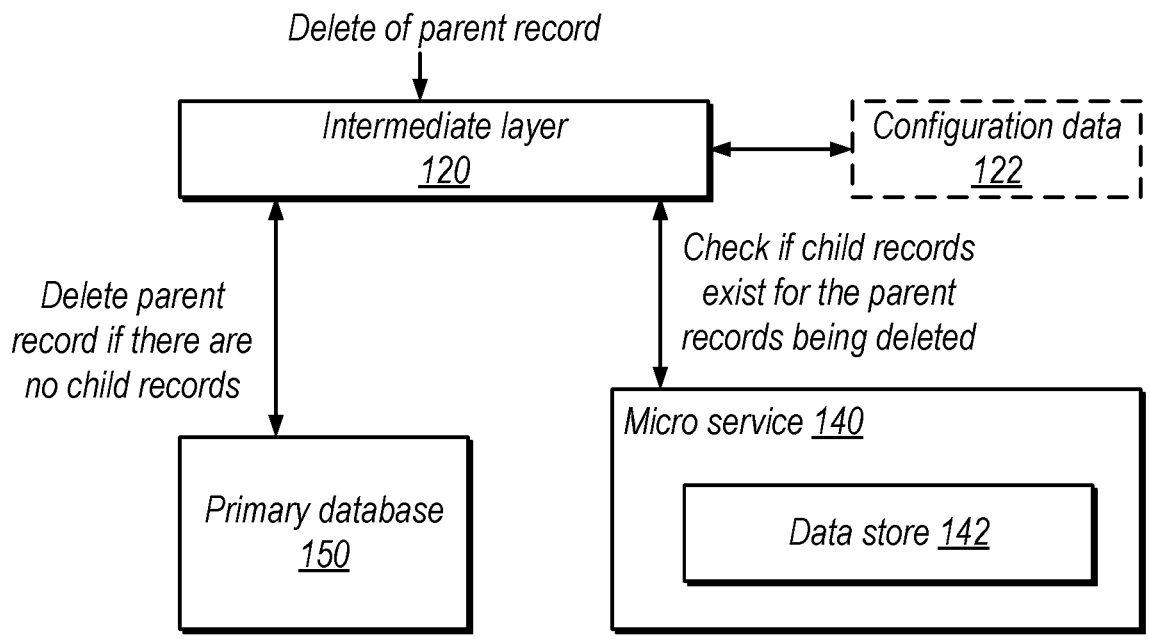
FIG. 6B is a diagram illustrating example handling of delete operation for a parent table, according to some embodiments.

FIG. 6B is a block diagram illustrating an example technique for handling deletion of a parent record, according to some embodiments. In the illustrated example, intermediate layer 120 receives a request to delete a parent record in primary database 150. In response, intermediate layer 120 accesses configuration data 122 and then accesses micro service 140 to check if child records exist for the parent record(s) being deleted. If there are no child records of the parent records being deleted, the requested deletion is performed. If there are dependent child records, intermediate layer 120 may send a failure notification or may delete both the parent and the child records to maintain data consistency.

Figure 6C:
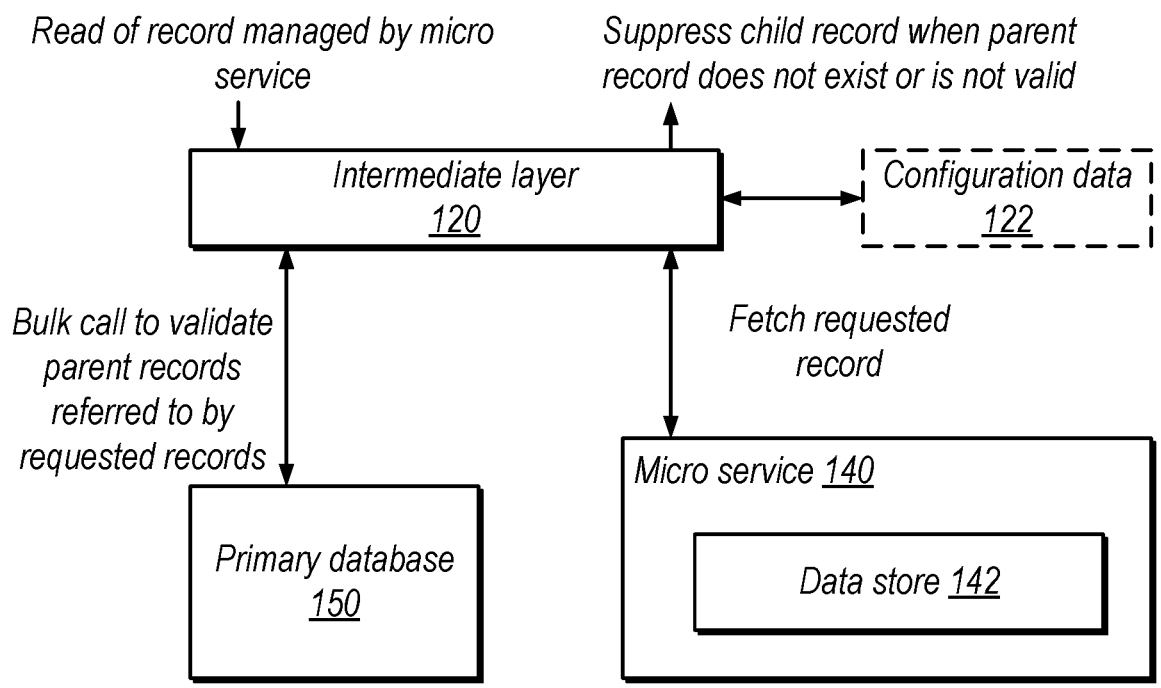
FIG. 6C is a diagram illustrating example handling of a read operation for a child table, according to some embodiments.

FIG. 6C is a block diagram illustrating an example technique for handling a read of data managed by a micro service, according to some embodiments. In the illustrated example, intermediate layer 120 receives a request to read a record managed by micro service 140. In response, intermediate layer 120 accesses configuration data 122 and then initiates a bulk call to validate parent records referred to by the requested records. Intermediate layer 120 also fetches the requested records from data store 142. In the illustrated example, intermediate layer 120 suppresses any child records that do not have valid parent records and returns only a subset of requested records in this scenario.

Note that there may be cases for read requests where a parent record is deleted while child record(s) still exist, e.g., due to in-flight requests. Intermediate layer 120 may detect these scenarios and delete the orphaned child records to maintain data consistency, in some embodiments.

In embodiments of a multi-tenant system, tenant data is arranged so that data of one tenant is kept separate from that of other tenants so that that one tenant does not have access to another tenant's data, unless such data is expressly shared. Each database instance may generally be viewed as a set of logical tables containing data fitted into predefined categories. Each table typically contains one or more data categories logically arranged in physical columns. Each row of a table typically contains a data record with information for each category defined by the columns. For example, a CRM database may include a table that describes a customer with columns for basic contact information such as name, address, phone number, fax number, etc. Another table may describe a purchase order, including columns for information such as customer, product, sale price, date, etc. Note that, in multi-tenant systems, a given database table may include entries for multiple different tenants. Therefore, the disclosed techniques may be implemented for multiple tenants, e.g., when tables shared by multiple tenants are distributed across database instances. Each tenant's data may be associate with one or more identifiers to differentiate that data from data for other tenants.

Example Method

Figure 7:
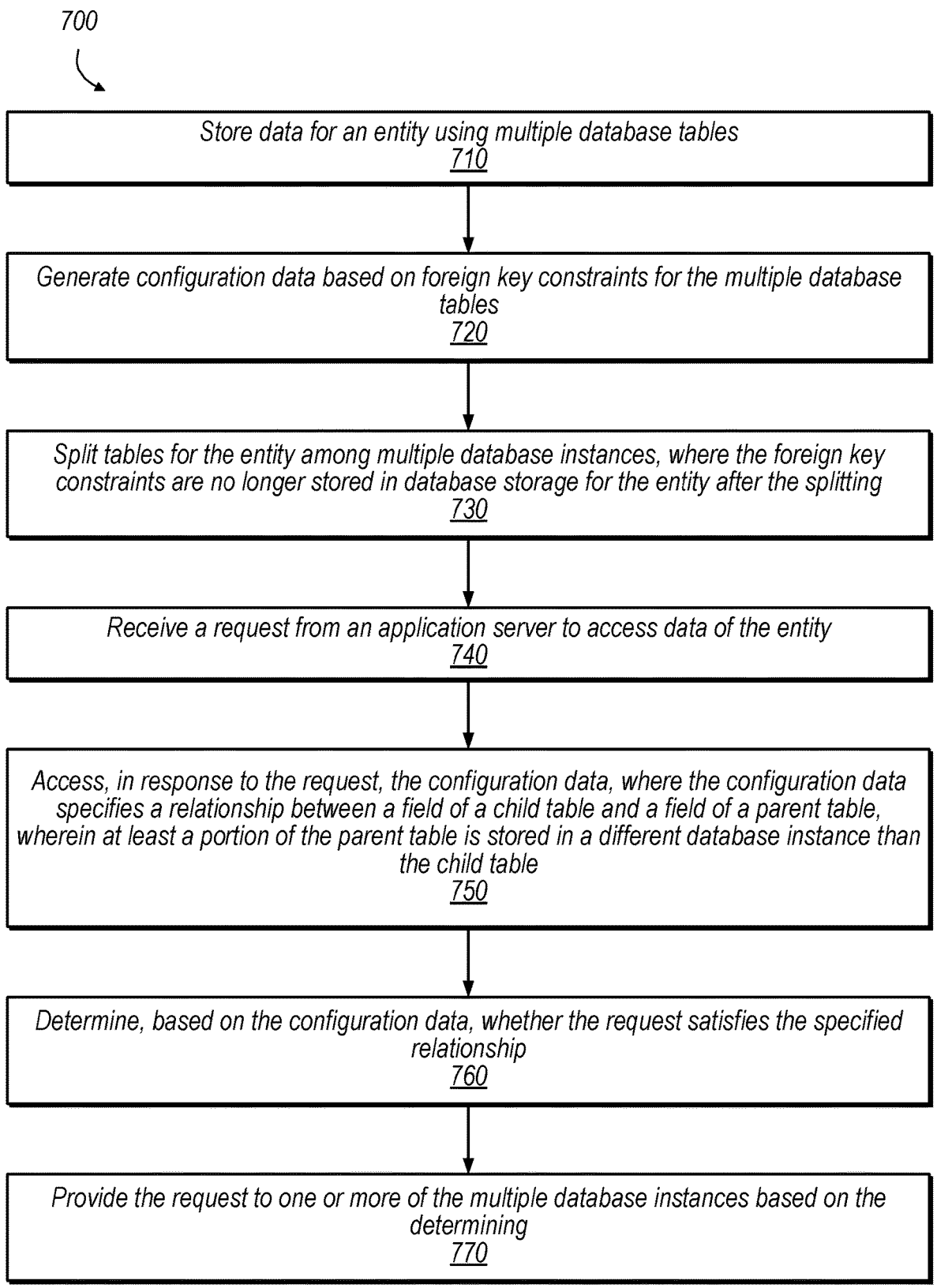
FIG. 7 is a flow diagram illustrating an example method for enforcing dependencies across tables stored in different database instances, according to some embodiments.

FIG. 7 is a flow diagram illustrating a method 700 for handling table dependencies using an intermediate layer, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a database system stores data for an entity using multiple database tables. In some embodiments, the entity is a tenant of a multi-tenant database system.

At 720, in the illustrated embodiment, the database system generates configuration data based on foreign key constraints for the multiple database tables.

At 730, in the illustrated embodiment, the database system splits tables for the entity among multiple database instances such that the foreign key constraints are no longer stored in database storage for the entity after the splitting. In some embodiments, the split is performed in response to data for the entity meeting one or more threshold criteria (e.g., a threshold data size, which may facilitate scaling the system for very large data sets). Note that in some embodiments the splitting may be performed before any data for the entity is actually stored, e.g., because a schema for an entity is initially stored across multiple database instances rather than being originated in a single database instance and then split.

At 740, in the illustrated embodiment, the database system receives a request from an application server to access data of the entity.

At 750, in the illustrated embodiment, the database system accesses, in response to the request, the configuration data, where the configuration data specifies a relationship between a field of a child table and a field of a parent table, where at least a portion of the parent table is stored in a different database instance than the child table. In some embodiments, a micro service maintains the child table after the split of element 730.

At 760, in the illustrated embodiment, the database system determines, based on the configuration data, whether the request satisfies the specified relationship. In some embodiments, an intermediate orchestration layer receives requests from an application layer, performs the determination of element 760, and submits requests to a database services layer.

In some embodiments, when the request is an insert, upsert, or update of data stored in the child table, the determining includes checking the parent table based on the configuration data to verify that one or more records in the parent table being referred to are valid. In some embodiments, when the request is a request to delete data stored in the parent table, the determining includes checking whether any records exist in the child table that reference data being deleted. This may include checking one or more in-flight database access requests to determine whether they reference data being deleted. In some embodiments, when the request is a read of data stored in the child table, the determining includes checking the parent table based on the configuration data to verify that one or more records in the parent table referred to by the read are valid. In some embodiments, the database returns only a portion of requested read data, where the portion does not include one or more records from the child table that failed the checking.

At 770, in the illustrated embodiment, the database system provides the request to one or more of the multiple database instances based on the determination.

Example Device

In some embodiments, any of various operations discussed herein may be performed by executing program instructions stored on a non-transitory computer readable medium. In these embodiments, the non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Figure 8:
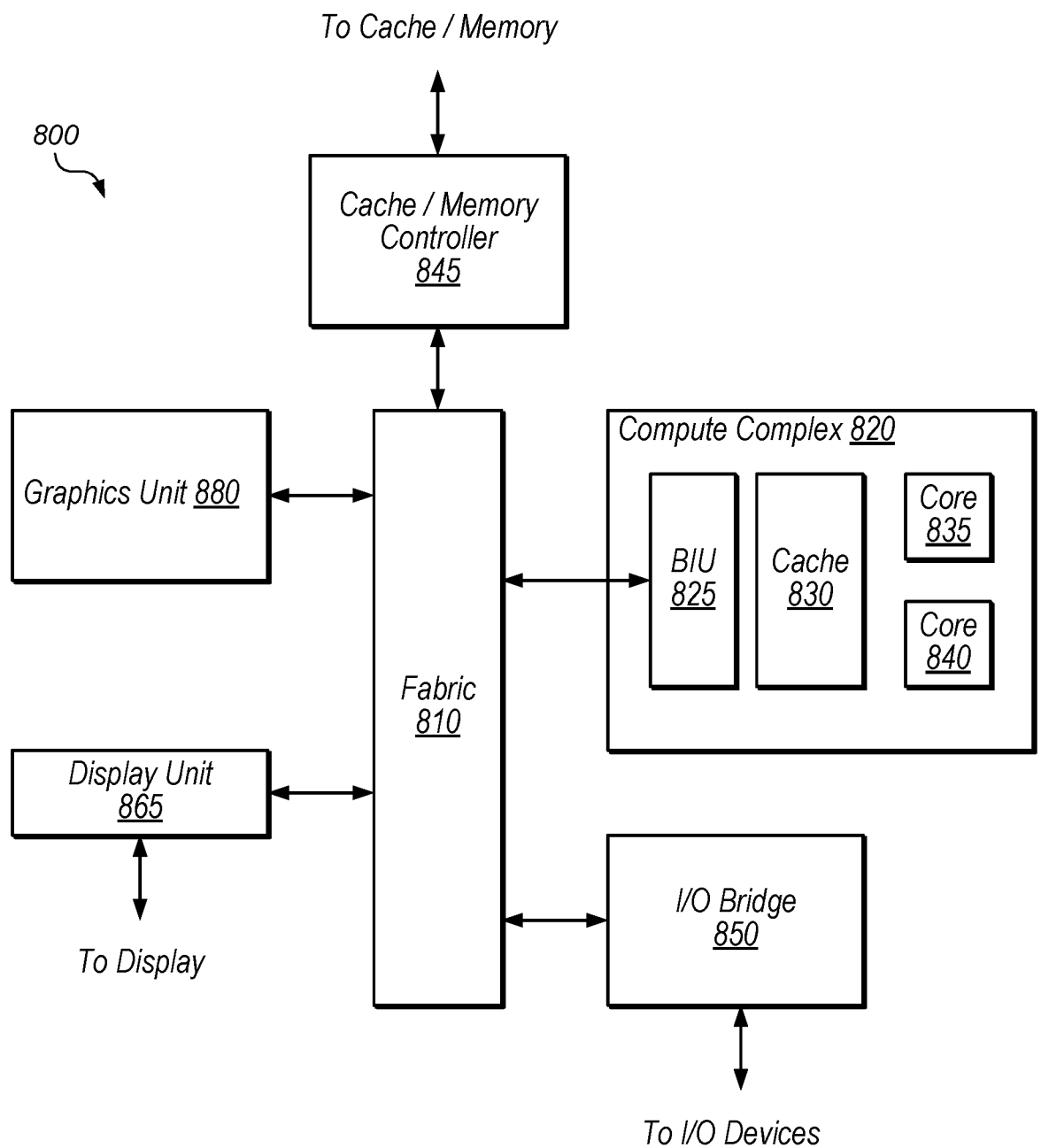
FIG. 8 is a block diagram illustrating an example computing system, according to some embodiments.

Referring now to FIG. 8, a block diagram illustrating an exemplary embodiment of a device 800 is shown. The illustrated processing elements may be used to implement all or a portion of the techniques discussed herein. In some embodiments, elements of device 800 may be included within a system on a chip. In the illustrated embodiment, device 800 includes fabric 810, compute complex 820, input/output (I/O) bridge 850, cache/memory controller 845, graphics unit 880, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 880 may be described as "coupled to" a memory through fabric 810 and cache/memory controller 845. In contrast, in the illustrated embodiment of FIG. 8, graphics unit 880 is "directly coupled" to fabric 810 because there are no intervening elements.

Graphics unit 880 may include one or more processors and/or one or more graphics processing units (GPU's). Graphics unit 880 may receive graphics-oriented instructions, such as OPENGL® or DIRECT3D® instructions, for example. Graphics unit 880 may execute specialized GPU instructions or perform other operations based on the received graphics-oriented instructions. Graphics unit 880 may generally be configured to process large blocks of data in parallel and may build images in a frame buffer for output to a display. Graphics unit 880 may include transform, lighting, triangle, and/or rendering engines in one or more graphics processing pipelines. Graphics unit 880 may output pixel information for display images.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    storing, by a database system, data for an entity using multiple database tables;
    generating, by the database system, configuration data based on foreign key constraints for the multiple database tables;
    splitting, by the database system, tables for the entity among multiple database instances, wherein the foreign key constraints are no longer stored in database storage for the entity after the splitting;
    receiving, by the database system, a request from an application server to access data of the entity;
    accessing, by the database system in response to the request, the configuration data, wherein the configuration data specifies a relationship between a field of a child table and a field of a parent table, wherein at least a portion of the parent table is stored in a different database instance than the child table;
    determining, by the database system based on the configuration data, whether the request satisfies the specified relationship; and
    providing, by the database system, the request to one or more of the multiple database instances based on the determining.

2. The method of claim 1, wherein the determining is performed by an orchestration layer that receives requests from an application layer and submits requests to a database services layer.

3. The method of claim 1, wherein the request is an insert, upsert, or update of data stored in the child table and the determining includes:
    checking the parent table based on the configuration data to verify that one or more records in the parent table being referred to are valid.

4. The method of claim 1, wherein the request is a request to delete data stored in the parent table and the determining includes:
    checking whether any records exist in the child table that reference data being deleted.

5. The method of claim 4, further comprising:
    checking one or more in-flight database access requests to determine whether they reference data being deleted.

6. The method of claim 1, wherein the request is a read of data stored in the child table, wherein the determining includes:
    checking the parent table based on the configuration data to verify that one or more records in the parent table referred to by the read are valid.

7. The method of claim 6, further comprising:
returning only a portion of requested read data, wherein the portion does not include one or more records from the child table that failed the checking.

8. The method of claim 1, wherein the entity is a tenant of a multi-tenant database system.

9. The method of claim 1, wherein the database system executes a micro service that maintains the child table.

10. The method of claim 1, wherein the splitting is performed in response to data for the entity meeting one or more threshold criteria.

11. A non-transitory computer-readable medium having computer instructions stored thereon that are capable of being executed by a computer system to cause operations comprising:
storing data for an entity using multiple database tables of a database;
generating configuration data based on foreign key constraints for the multiple database tables;
splitting tables for the entity among multiple database instances, wherein the foreign key constraints are no longer stored in database storage for the entity after the splitting;
receiving a request from an application server to access data of the entity;
accessing, in response to the request, the configuration data, wherein the configuration data specifies a relationship between a field of a child table and a field of a parent table, wherein at least a portion of the parent table is stored in a different database instance than the child table;
determining, based on the configuration data, whether the request satisfies the specified relationship; and
providing the request to one or more of the multiple database instances based on the determining.

12. The non-transitory computer-readable medium of claim 11, wherein the request is an insert, upsert, or update of data stored in the child table and the determining includes:
determining whether one or more records in the parent table being referred to are present.

13. The non-transitory computer-readable medium of claim 11, wherein the request is a request to delete data stored in the parent table and the determining includes:
determining whether any records exist in the child table that reference data being deleted.

14. The non-transitory computer-readable medium of claim 11, wherein the request is a read of data stored in the child table, wherein the determining includes:
checking the parent table based on the configuration data to verify that one or more records in the parent table referred to by the read are valid.

15. The non-transitory computer-readable medium of claim 11, wherein the entity is a tenant of a multi-tenant database system.

16. The non-transitory computer-readable medium of claim 11, wherein the computer system is configured to execute a micro service that maintains the child table and wherein the determining is performed by an orchestration layer that receives requests from an application layer and submits requests to a database services layer.

17. A database system, comprising:
one or more processors; and
one or more memories having computer instructions stored thereon that are capable of being executed by a the one or more processors to:
store data for an entity using multiple database tables of a database;
generate configuration data based on foreign key constraints for the multiple database tables;
split tables for the entity among multiple database instances, wherein the foreign key constraints are no longer stored in database storage for the entity after the split;
receive a request from an application server to access data of the entity;
access, in response to the request, the configuration data, wherein the configuration data specifies a relationship between a field of a child table and a field of a parent table, wherein at least a portion of the parent table is stored in a different database instance than the child table;
determine, based on the configuration data, whether the request satisfies the specified relationship; and
provide the request to one or more of the multiple database instances based on the determination.

18. The database system of claim 17, wherein the request is an insert, upsert, or update of data stored in the child table and the determination includes to:
check the parent table based on the configuration data to verify that one or more records in the parent table being referred to are valid.

19. The database system of claim 17, wherein the request is a request to delete data stored in the parent table and the determination includes to:
check whether any records exist in the child table that reference data being deleted.

20. The database system of claim 17, wherein the request is a read of data stored in the child table, wherein the determination includes to:
check the parent table based on the configuration data to verify that one or more records in the parent table referred to by the read are valid.

* * * * *